United States Patent
Chen et al.

(10) Patent No.: US 7,310,311 B2
(45) Date of Patent: Dec. 18, 2007

(54) ETHERNET SWITCH WITH RATE CONTROL AND ASSOCIATED METHOD

(75) Inventors: Jen-Kai Chen, Taipei (TW); Hsiao-Lung Wu, Taipei (TW); Hsiang-Yi Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 1056 days.

(21) Appl. No.: 10/384,697

(22) Filed: Mar. 11, 2003

(65) Prior Publication Data

US 2003/0185157 A1    Oct. 2, 2003

(30) Foreign Application Priority Data

Mar. 22, 2002    (TW) ............................... 91105653 A

(51) Int. Cl.
*G01R 31/08*    (2006.01)
*H04J 1/16*    (2006.01)
*H04L 1/00*    (2006.01)

(52) U.S. Cl. .................. 370/235; 370/230; 370/230.1; 370/231; 370/232; 370/252

(58) Field of Classification Search .................... None
See application file for complete search history.

(56) References Cited

U.S. PATENT DOCUMENTS 6,704,280 B1 *    3/2004    Mangin et al. ............. 370/230
2002/0131365 A1 *    9/2002    Barker et al. ............... 370/235

* cited by examiner

*Primary Examiner*—Raj K Jain
(74) *Attorney, Agent, or Firm*—Troxell Law Office, PLLC

(57) ABSTRACT

An Ethernet switch with rate control and associated method is provided. Each port in the switch has individual settings of egress/ingress) rate control, which are stored in a register and configured based on required rates. The switch uses data volume that a port can output/input within each unit time to control egress/ingress rate of the port. Further, the egress rate can be precisely controlled by using uniform random numbers provided by an random number generator of the switch, and the ingress rate can be advantageously controlled by combining a proper kind of congestion control, which is performed according to the capability of a device connected to the port, such as full-duplex or half-duplex, and flow control.

14 Claims, 3 Drawing Sheets

ETHERNET SWITCH WITH RATE CONTROL AND ASSOCIATED METHOD

BACKGROUND OF THE INVENTION (a) Field of the Invention

The present invention relates in general to network rate control, and more particularly to egress/ingress rate control for each port in an Ethernet switch.

(b) Description of the Prior Arts

Under the e-trend, Local Area Network (LAN) has become part of infrastructure for most companies and institutions in recent years. Though there are many kinds of LAN technologies, such as Ethernet, Token Ring and Fiber Distributed Data Interface (FDDI), the most commonly used is Ethernet. Furthermore, fast Ethernet upgrades transmission rate from 10 Mbps to 100 Mbps (even 1 Gbps now).

In Ethernet network, a hub or a switch connects PCs, workstations, servers and so on. Though an Ethernet hub costs less, its bandwidth is shared by all devices connected thereto. Thus the more the connected devices, the more frequently collisions of packets happen. This will impact the performance of network seriously when traffic is heavy.

To solve the problem mentioned, an Ethernet switch is developed. The Ethernet switch learns addresses to record addresses of connected devices in a forwarding table. When the switch receives a frame, it will check whether the destination address of the frame is in the forwarding table. If so, it will forward the frame to a corresponding port; if not, it will broadcast the frame. Based on source MAC (SMAC) address and source port of a packet, the switch updates the forwarding table, and establishes a new correspondence between the destination address and the port. The Ethernet switch can better utilize its bandwidth through the above mechanism and improve the efficiency of network operation.

An Ethernet switch can perform congestion control to improve network throughput. IEEE supplements 802.3 u standard with auto negotiation that allows an Ethernet switch and a device (a network interface card, for example) connected thereto acquiring the capability of each other. The Ethernet switch starts the auto negotiation with the connected device in order to negotiate a proper kind of congestion control according to the capability of the connected device. Generally speaking, there are three kinds of congestion control: (1) When the connected device is full-duplex and capable of flow control, flow control is performed. The switch sends out a flow control frame to request the connected device to stop transmitting packets and to restore after escaping congestion. (2) When the connected device is full-duplex and incapable of flow control, drop control is performed. That is, the switch directly drops packets transmitted by the connected device. (3) When the connected device is half-duplex and incapable of flow control, back-pressure is performed. The switch sends out a collision signal to damage a packet in transmitting, and if the connected device detects the collision, it would wait a period of time calculated by Binary Exponential Backoff Algorithm before transmitting the packet again.

Though the Ethernet switch has the advantages mentioned above, there are still drawbacks. In some cases, it is necessary for the switch to perform bandwidth control, That is, the rate of each port in the switch can be adjusted in response to various requirements. For example, an Ethernet local area network typically connects to the Internet via a switch with the help of Internet Service Providers (ISPs). Most ISPs adopt transmission media with wide bandwidth such as optical fibers to build their infrastructure for future upgrade. However, as network throughput that equipments of the ISPs can process is limited, and the ISPs may need to charge different fares for different bandwidth, it is preferred to control transmission rate for different clients. But a conventional Ethernet switch is unable to do this. Consequently, if an access equipment of a client has high access bandwidth, then the client who pays less can still use bandwidth as much as possible without limits. This would invade rights of other users who pay more.

Moreover, if transmission rate of each port in a switch can be adjusted, then network administrators can manage bandwidth efficiently according to the demands of users. However, a conventional Ethernet switch does not provide this kind of function.

SUMMARY OF THE INVENTION

To solve the problem of the conventional Ethernet switch, the present invention provides an Ethernet switch with rate control and associated method. The Ethernet switch provides individual settings of egress and ingress rate control for each port and stores setting values in a register. Then the switch performs egress and ingress rate control according to these setting values which are configured based on required rates.

A major feature of the present invention lies in using data volume that a port can output/input within each unit time to control egress/ingress rate of the port. The unit time and the data volume here are referred to as "accounting time" and "budget" respectively, and included in the settings of egress and ingress rate control.

As to egress rate control, it is a common situation that the size of a last packet to be outputted via a port is larger than remaining budget of the port within a period of accounting time. If the switch always allows to send out the last packet, the actual egress rate of the port would be faster than a required rate because a certain amount of data larger than the remaining budget is outputted in most periods of accounting time; on the contrary, if the switch always forbid to send out the last packet, then the actual egress rate would be slower than the required rate because part of the whole budget is left unused in most periods of accounting time. In view of this, the switch of the present invention includes a random number generator for providing uniform random numbers. The switch uses these uniform random numbers to determine if the last packet of a period of accounting time can be outputted such that the probability of both allowance and forbiddance is 50%. And then the egress rate of the port is substantially maintained in the required rate statistically in view of a longer period.

As to ingress rate control, if the budget of a port is exhausted in a period of accounting time, the switch of the present invention enables a proper kind of congestion control according to the capability of a device connected to the port, such as full/half-duplex, and flow control, thereby preventing the port from inputting any packet.

DETAILED DESCRIPTION OF THE PRESENT INVENTION

The detailed description with a preferred embodiment and appended drawings is provided to better understand the goals and features of the present invention.

Figure 1:
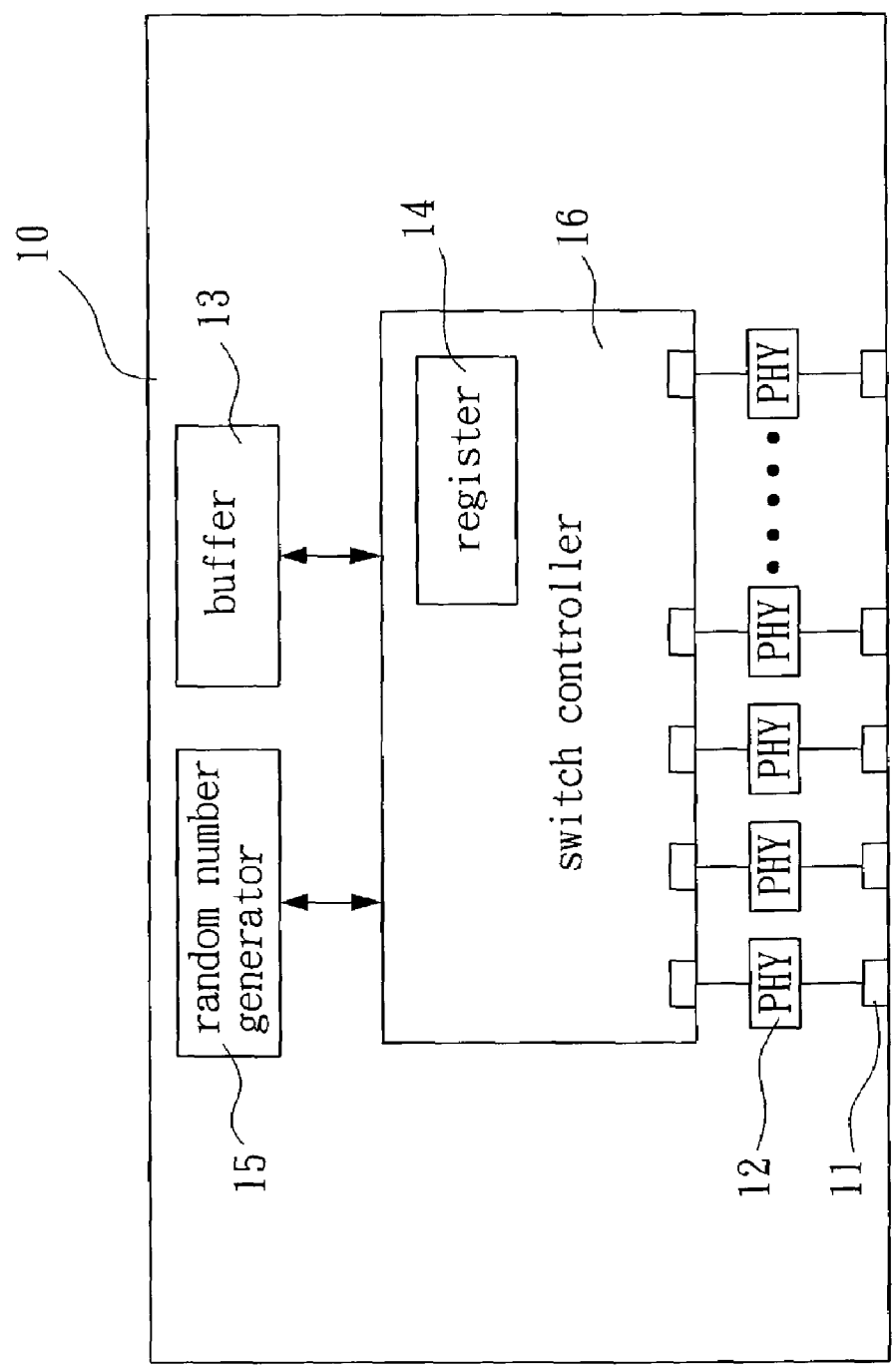
FIG. 1 shows a block diagram of an Ethernet switch according to the present invention.

FIG. 1 is a block diagram of an Ethernet switch according to the present invention. As shown in FIG. 1, the Ethernet switch 10 comprises: a plurality of ports 11 for tranceiving packets; a plurality of PHY devices 12, coupled to the ports 11 respectively; a buffer 13 for temporarily storing packets to be sent out; a random number generator 15 for generating uniform random numbers; and a switch controller 16, coupled to the PHY devices 12, the buffer 13 and the random number generator 15, for performing egress and ingress rate control for the ports 11. The switch controller 16 further comprises a register 14 for storing setting values of egress and ingress rate control for the ports 11.

Each port 11 has individual settings for egress and ingress rate control. The egress rate control settings preferably include a setting to enable/disable egress rate control, a setting to select accounting time, and a setting to program outbound budget. The ingress rate control settings preferably include a setting to enable/disable ingress rate control, a setting to select accounting time, and a setting to program inbound budget. The setting values for egress/ingress rate control of a port 11 are stored in the register 14, and can be modified by the switch controller 16 based on whether the port 11 needs to enable egress/ingress rate control and required egress/ingress rates. Preferably, the switch 10 further comprises a central processing unit (CPU) interface which is coupled to the switch controller 16 and an external computing device with a CPU, such as a personal computer (PC). With the help of associated software, the external computing device can access the register 14 via the CPU interface. Therefore, it is very convenient for network administrators to perform remote control for egress/ingress rate of each port 11 of the switch 10. In the present invention, the method for egress rate control is slightly different from the method for ingress rate control, and both would be described separately below.

As for egress rate control, if there is at least one packet in the buffer 13 to be sent out via a port 11, then the switch controller 16 checks the egress rate control setting of the port 11. If the setting of egress rate control is enabled, then the switch controller 16 controls egress rate of the port 11 according to setting values of accounting time and outbound budget, as well as uniform random numbers generated by the random number generator 15.

Figure 2:
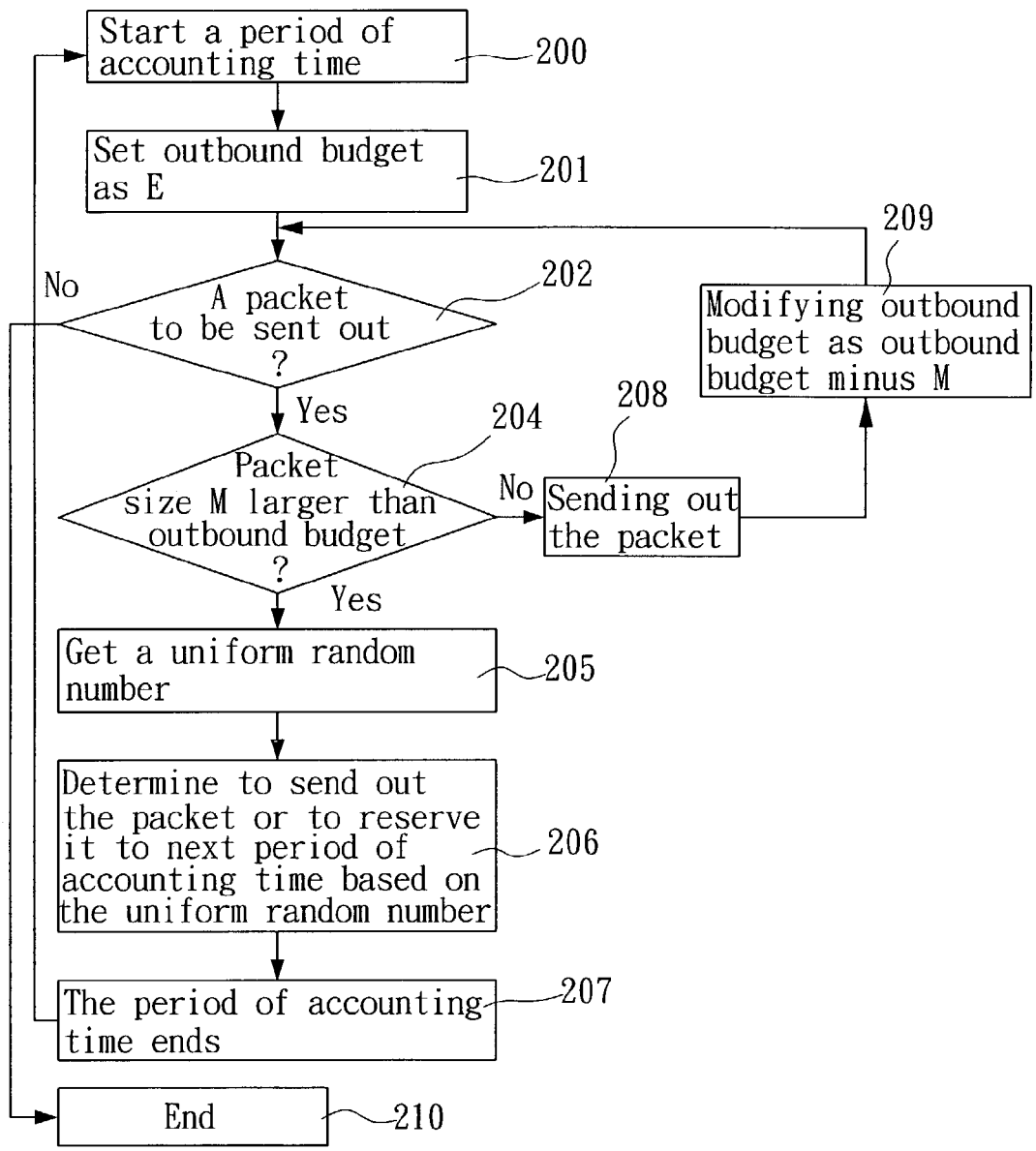
FIG. 2 shows a flow chart of egress rate control for a port in the switch of FIG. 1 according to the preferred embodiment of the present invention.

FIG. 2 is a flow chart of the egress rate control for the port 11 according to the preferred embodiment of the present invention. The flow comprises steps of:

| | |
|---|---|
| 200 | starting a period of accounting time; |
| 201 | setting outbound budget of the port 11 as a predetermined value E; |
| 202 | examining if there is a packet to be sent out via the port 11, wherein if examining result is no, then the flow proceeds to step 210, and if the examining result is yes, then the flow proceeds to step 204; |
| 204 | checking if packet size M is larger than the outbound budget, wherein if checking result is no, then the flow proceeds to step 208, and if the checking result is yes, then the flow proceeds to step 205; |
| 205 | obtaining a uniform random number from the random number generator 15; |
| 206 | determining to send out the packet or to reserve it to next period of accounting time based on the uniform random number; |
| 207 | returning to step 200 when the period of accounting time ends, and then starting next period of accounting time; |
| 208 | sending out the packet; |
| 209 | modifying the outbound budget as the outbound budget minus M, and then returning to step 202; and |
| 210 | completing the flow. |

The switch 10 can control the egress rate precisely by performing the flow in FIG. 2. For example, if required egress rate of a port 11 is 1 Mbps, we can configure the setting of egress rate control of the port 11 as enabled, select 100 ms as accounting time, and program outbound budget as 1542 qwords (1 qword=8 bytes). After packet transmission starts, the outbound budget decreases by the size of transmitted packets. If the size of next packet to be sent out is larger than remaining outbound budget, then the next packet is processed according to a uniform random number provided by the random number generator 15. Therefore, there is 50% probability to send out the packet and also 50% probability to hold it in the buffer until next period of accounting time. When the next period of accounting time starts, the outbound budget is reset to 1542 qwords and the flow in FIG. 2 repeats. It can be observed that the egress rate is substantially maintained in 1 Mbps statistically in view of a longer period (several seconds for example).

As for ingress rate control, if there is at least one packet to be received via a port 11, then the switch controller 16 checks the ingress rate control setting of the port 11. If the setting of ingress rate control is enabled, the switch controller 16 controls ingress rate of the port 11 according to setting values of accounting time and inbound budget.

Figure 3:
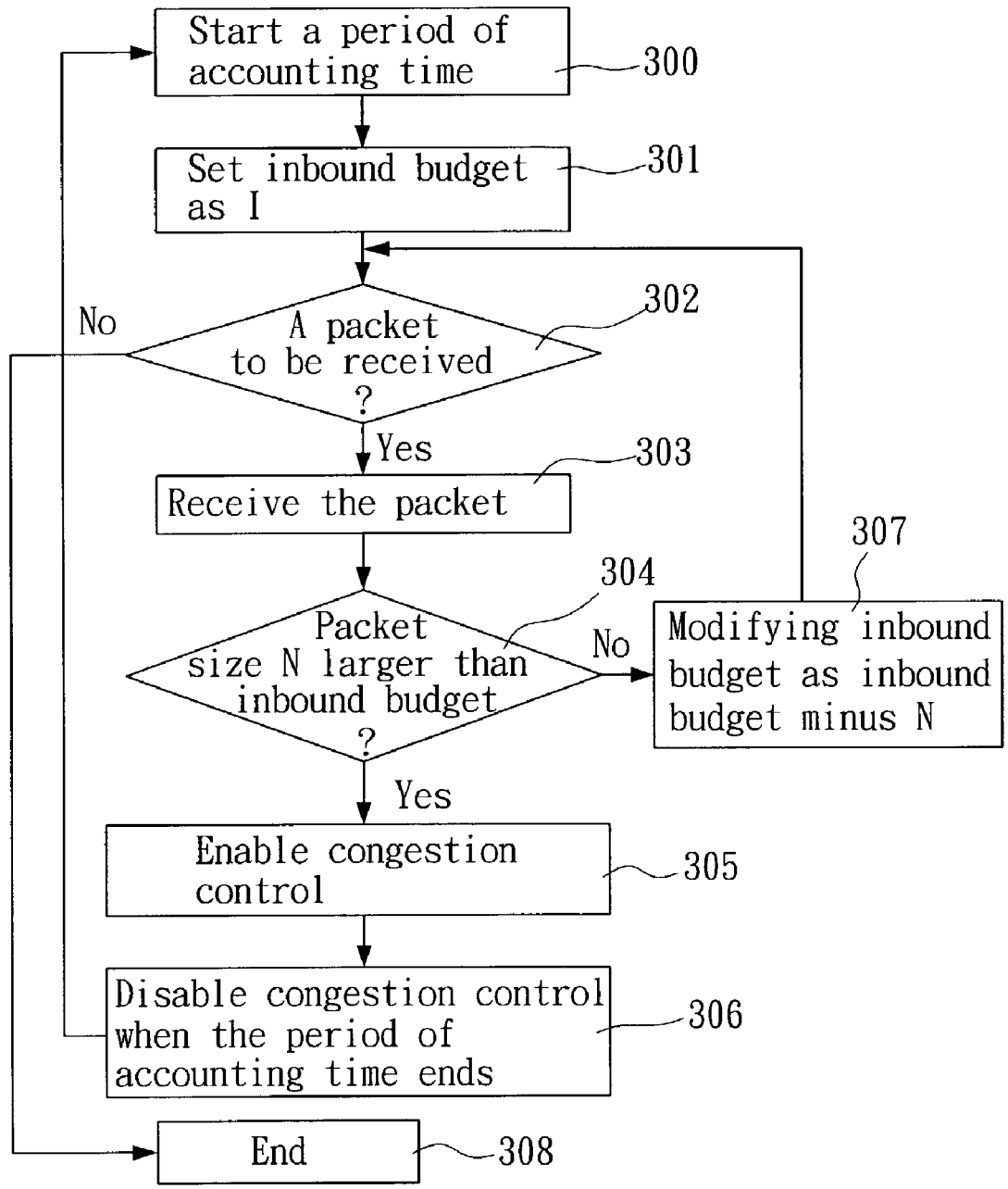
FIG. 3 shows a flow chart of ingress rate control for a port in the switch of FIG. 1 according to the preferred embodiment of the present invention.

FIG. 3 is a flow chart of the ingress rate control for the port 11 according to the preferred embodiment of the present invention. The flow comprises steps of:

| | |
|---|---|
| 300 | starting a period of accounting time; |
| 301 | setting inbound budget of the port 11 as a predetermined value I; |
| 302 | examining if there is a packet to be received via the port 11, wherein if examining result is no, then the flow proceeds to step 308, and if the examining result is yes, then the flow proceeds to step 303; |
| 303 | receiving the packet; |
| 304 | checking if packet size N is larger than the inbound budget, wherein if checking result is no, then the flow proceeds to step 307, and if the checking result is yes, then the flow proceeds to step 305; |
| 305 | enabling a kind of congestion control for the port 11; |
| 306 | disabling the kind of congestion control when the period of accounting time ends, and then returning to step 300 and starting next period of accounting time; |
| 307 | modifying the inbound budget as the inbound budget minus N, then returning to step 302; and |
| 308 | completing the flow. |

The flow in FIG. 3 performs ingress rate control by combining congestion control. There are mainly three kinds of congestion control: flow control, drop control and backpressure. Which kind is performed depends on the capability of a device connected to the port 11. When the connected device is full-duplex and capable of flow control, flow control is performed. The switch controller 16 would send out a pause frame in response to remaining accounting time, thereby instructing a source port to rest a predetermined period of time (30 ms for instance). When the connected device is full-duplex and incapable of flow control, drop control is performed. When the connected device is half-duplex, backpressure is performed.

For example, if required ingress rate of a port 11 is 1 Mbps, we can configure the setting of ingress rate control of the port 11 as enabled, select 100 ms as accounting time, and program inbound budget as 1542 qwords. After packet reception starts, the inbound budget decreases by the size of received packets. If the size of next packet to be received is larger than remaining inbound budget, then a proper kind of congestion control is enabled based on the above criteria so that the port 11 stops receiving packets for a predetermined period. When the current period of accounting time ends, congestion control is disabled accordingly. Then the inbound budget is reset to 1542 qwords and the flow in FIG. 3 repeats.

To sum up, the present invention provides an Ethernet switch with rate control and associated method. Thus network administrators and ISPs can manage network bandwidth more efficiently and flexibly.

While the present invention has been shown and described with reference to a preferred embodiment thereof, and in terms of the illustrative drawings, it should be not considered as limited thereby. Various possible modification and alterations could be conceived of by one skilled in the art to the form and the content of any particular embodiment, without departing from the scope and the sprit of the present invention.

What is claimed is:

1. A method for rate control used in an Ethernet switch comprising at least one port with an associated budget, the method comprising following steps in a predetermined period of accounting time:
    a. setting the associated budget as a predetermined value Q;
    b. examining if there is a packet to be tranceived via the port of the Ethernet switch;
    c. checking if size S of the packet is larger than the budget when examining result of the step b is yes;
    d. tranceiving the packet when checking result of the step c is no, and then modifying the budget as the budget minus S; and
    e. returning to the step b,
    wherein the budget is an outbound budget, and the tranceiving in the step d comprises outputting the packet,
    wherein if the checking result of the step c is yes, then the method further comprises a step c1 subsequent to the step c:
    c1. generating a uniform random number for determining whether to output the packet or reserve the packet until a next period of accounting time.

2. The method for rate control of claim 1, wherein the port has an associated setting of enabling/disabling rate control, and if the associated setting is disabled, then stop flow of the steps a to e.

3. The method for rate control of claim 2, wherein the budget, the period of accounting time, and the setting of enabling/disabling rate control are stored in a register which can be accessed via a CPU interface of the switch.

4. The method for rate control of claim 1, wherein the budget is an inbound budget, and the tranceiving in the step d comprises inputting the packet.

5. The method for rate control of claim 4, wherein if the checking result in the step c is yes, then the method further comprises a step c1 subsequent to the step c:
    c1. performing congestion control for the port while the size of the packet exceeds the budget.

6. The method for rate control of claim 5, further comprising a step c2 subsequent to the step c1: c2. stopping congestion control for the port when the period of accounting time ends.

7. The method for rate control of claim 5, wherein the congestion control includes flow control, drop control and backpressure.

8. The method for rate control of claim 7, wherein flow control is enabled in the step c1 when a device connected to the port is full-duplex and capable of flow control.

9. The method for rate control of claim 7, wherein drop control is enabled in the step c1 when a device connected to the port is full-duplex and incapable of flow control.

10. The method for rate control of claim 7, wherein backpressure is enabled in the step c1 when a device connected to the port is half-duplex.

11. An Ethernet switch comprising:
    at least one port of the Ethernet switch for tranceiving a packet;
    a buffer for storing the packet;
    a switch controller, coupled to the buffer and the port, for configuring the port with an associated budget, wherein the associated budget is set as a predetermined value Q for controlling rate of the port when each predetermined period of accounting time starts,
    wherein the switch controller checks whether size S of the packet is larger than the budget, and if checking result is no, then the switch controller tranceives the packet and modifies the budget as the budget minus S, wherein the budget minus S is used to compare with size of next packet to be; and
    a random number generator for generating at least a random number, wherein when the budget for the port is an outbound budget and the size of a first packet to be outputted is larger than the outbound budget, the switch controller selectively outputs the first packet in response to the random number and selectively reserves the packet until a next period of accounting time in response to the random number.

12. The Ethernet switch of claim 11, wherein the port has an associated setting of enabling/disabling rate control, and if the associated setting is disabled, then the switch controller stops rate control for the port.

13. The Ethernet switch of claim 11, wherein the switch controller comprises a register for storing the budget, the period of accounting time, and the setting of enabling/disabling rate control for the port.

14. The Ethernet switch of claim 13, further comprising:
    a CPU interface coupled to the switch controller, wherein the register can be accessed via the CPU interface.

\* \* \* \* \*